(12) United States Patent
Stephan et al.

(10) Patent No.: US 12,543,708 B2
(45) Date of Patent: Feb. 10, 2026

(54) ILLUMINATION SYSTEM

(71) Applicant: SIGNIFY HOLDING B.V., Eindhoven (NL)

(72) Inventors: Aaron Benjamin Stephan, Chanhassen, MN (US); Curtis Allen Leyk, Albany, MN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/689,890

(22) PCT Filed: Sep. 6, 2022

(86) PCT No.: PCT/EP2022/074693
§ 371 (c)(1),
(2) Date: Mar. 7, 2024

(87) PCT Pub. No.: WO2023/036759
PCT Pub. Date: Mar. 16, 2023

(65) Prior Publication Data
US 2024/0381850 A1 Nov. 21, 2024

Related U.S. Application Data

(60) Provisional application No. 63/241,718, filed on Sep. 8, 2021.

(30) Foreign Application Priority Data
Sep. 23, 2021 (EP) .................................... 21198467

(51) Int. Cl.
*A01K 29/00* (2006.01)
*A01K 31/18* (2006.01)
(Continued)

(52) U.S. Cl.
CPC ............ *A01K 31/18* (2013.01); *A01K 29/005* (2013.01); *A01K 39/012* (2013.01);
(Continued)

(58) Field of Classification Search
CPC ...... A01K 29/00; A01K 29/005; A01K 31/00; A01K 31/02; A01K 31/18; A01K 31/22; A01K 45/00
See application file for complete search history.

(56) References Cited

U.S. PATENT DOCUMENTS 9,700,257 B1 * 7/2017 Betts-Lacroix .... G01N 21/6428
2005/0276720 A1 * 12/2005 Correa ................... A01K 45/00
422/24
(Continued)

FOREIGN PATENT DOCUMENTS

CN 109197765 A 1/2019
KR 20110100567 A 9/2011
(Continued)

*Primary Examiner* — Joshua J Michener
*Assistant Examiner* — Nicole Paige Maccrate

(57) ABSTRACT

The invention provides an illumination system arranged to illuminate a space for rearing a flock of birds, wherein the illumination system comprises: a visible light source configured to emit visible light; an ultraviolet light source configured to emit ultraviolet light; a controller configured to: (i) entrain a circadian rhythm of the flock of birds by controlling the visible light source to emit the visible light for a predetermined period of light, and not to emit the visible light for a predetermined period of dark; (ii) control the ultraviolet light source to emit the ultraviolet light at an ultraviolet light intensity for at least one subperiod within the predetermined period of dark, wherein the ultraviolet light comprises a peak wavelength within the UV-A wavelength range.

18 Claims, 4 Drawing Sheets

(51) Int. Cl.
    *A01K 39/012*     (2006.01)
    *A61N 5/06*     (2006.01)
    *F21V 23/04*     (2006.01)
    *F21Y 113/00*     (2016.01)

(52) U.S. Cl.
    CPC ........ *F21V 23/0471* (2013.01); *A61N 5/0618* (2013.01); *A61N 2005/0626* (2013.01); *A61N 2005/0661* (2013.01); *A61N 2005/0662* (2013.01); *F21Y 2113/30* (2023.05)

(56) References Cited

U.S. PATENT DOCUMENTS

| | | | | |
|---|---|---|---|---|
| 2010/0236497 | A1* | 9/2010 | Philiben | A01K 11/008 |
| | | | | 119/712 |
| 2017/0000163 | A1* | 1/2017 | Grajcar | A01K 39/00 |
| 2017/0142940 | A1* | 5/2017 | Suntych | A01K 39/012 |
| 2017/0259079 | A1* | 9/2017 | Grajcar | A01G 7/045 |
| 2017/0290124 | A1* | 10/2017 | Grajcar | H05B 45/20 |
| 2018/0235186 | A1* | 8/2018 | Masters | A01K 31/12 |
| 2020/0037583 | A1* | 2/2020 | Grajcar | A01K 31/22 |
| 2020/0178473 | A1* | 6/2020 | Ashdown | H05B 47/16 |
| 2021/0162162 | A1* | 6/2021 | Leirs | H05B 45/10 |
| 2023/0025970 | A1* | 1/2023 | Suntych | A01K 29/00 |

FOREIGN PATENT DOCUMENTS

| | | |
|---|---|---|
| NL | 2021710 B1 | 5/2020 |
| WO | 2011116251 A1 | 9/2011 |
| WO | 2017087077 A1 | 5/2017 |
| WO | 2019086688 A1 | 5/2019 |

\* cited by examiner

ILLUMINATION SYSTEM

CROSS-REFERENCE TO PRIOR APPLICATIONS

This application is the U.S. National Phase application under 35 U.S.C. § 371 of International Application No. PCT/EP2022/074693, filed on Sep. 6, 2022, which claims the benefit of U.S. Provisional Patent Application No. 63/241,718, filed on Sep. 8, 2021 and European Patent Application No. 21198467.9, filed on Sep. 23, 2021. These applications are hereby incorporated by reference herein.

FIELD OF THE INVENTION

The invention relates to an illumination system arranged to illuminate a space for rearing a flock of birds. The invention further relates to a method of illuminating a space for rearing a flock of birds; and a corresponding computer program product.

BACKGROUND OF THE INVENTION

A relevant part of the global animal farming business consists of the rearing of birds, such as for example growing broilers in poultry farming. Even though economics of scale and production efficiency have driven poultry faming forward, modern poultry farming has become more and more concerned with improving animal health and wellbeing as well. This is a clear challenge.

For example: Modern poultry are very fast growing. A broiler weighing 40 grams as newly hatched chick is grown to bird weighing 5 kilograms within about eight weeks. This large and fast growth requires significant inputs of feed and water.

Furthermore, such growth is often facilitated by regulating the sleep-awake cycle of said poultry. Namely, the artificial lighting in poultry farms is often adapted to entrain a circadian rhythm of said poultry. Such circadian lighting is generally characterized by providing a 24-hour cycle to the poultry, which cycle comprises periods of light (or: day), when the artificial lighting is on, and periods of dark (or: night), when the artificial lighting is off. US2017000163 discloses a method of increasing feed intake of an animal, including a light source producing light under 400 nm when dimmed.

Extending the period of light (or: day) is thereby considered beneficial for increasing the pace of broiler growth, but detrimental for animal health and welfare, as the poultry also need a certain amount of sleep to prevent sleep deprivation and/or to physically recover. Too long periods of light even disrupts the natural melatonin cycle (or natural circadian rhythm) of said poultry. Hence, many jurisdictions regulate artificial lighting in poultry farming, especially a minimum number of hours for the period of dark, to safeguard animal health and wellbeing.

For example: The Canadian '*Code of Practice for the Care and Handling of Hatching Eggs, Breeders, Chickens and Turkeys*' recommends a dark period of minimum 4 hours by day 5 of bird placement, and from day five of placement through to no sooner than seven days prior to catching, birds kept in barns must have a dark period of at least four straight hours in each 24-hour period.

For example: *Council Directive* 2007/43/*EC* of the European Union defines that within seven days from the time when the chickens are placed in the building and until three days before the foreseen time of slaughter, the lighting must follow a 24-hour rhythm and include periods of darkness lasting at least six hours in total, with at least one uninterrupted period of darkness of at least four hours, excluding dimming periods.

Hence, to safeguard the health and wellbeing of poultry, and to retain a healthy melatonin cycle, it is generally recognized that it is beneficial to provide birds with a minimum number of hours of dark. However, during the period of dark, the birds do not eat and drink (due to sleep or inability to find food in the dark), and their gastrointestinal tracts are nearly empty by 'morning', when the artificial lighting is turned back on. This may be disadvantageous.

Namely, upon the start of the period of light (or: day), the birds are very hungry and exhibit a voraciously eating behavior. It is found that this causes a sudden influx of large amounts of feed into the digestive tract, which may then lead to inconsistent feeding, gastrointestinal upset, or even disease in susceptible birds. Moreover, as space may be limited around a feeding through or water nipple, it is found that birds may exhibit increased aggression and crowding, when the birds are eating and/or drinking all at once. This behavior may undesirably result in bruising, other injuries, and a general increase in stress.

All in all, in poultry farming and/or the rearing of birds in particular, there is a clear need to improve the health and wellbeing of said birds, while maintaining growth targets, and without disturbing their circadian rhythm.

SUMMARY OF THE INVENTION

It is an object of the invention to provide an improved illumination system, which at least alleviates the problems and disadvantages mentioned above. Thereto, the invention provides an illumination system arranged to illuminate a space for rearing a flock of birds, wherein the illumination system comprises: a visible light source configured to emit visible light; an ultraviolet light source configured to emit ultraviolet light; a controller configured to: (i) entrain a circadian rhythm of the flock of birds by controlling the visible light source to emit the visible light for a predetermined period of light, and not to emit the visible light for a predetermined period of dark; (ii) control the ultraviolet light source to emit the ultraviolet light at an ultraviolet light intensity for at least one subperiod within the predetermined period of dark, wherein the ultraviolet light comprises a peak wavelength within the UV-A wavelength range.

Since the avian eye contains five cone receptors, of which a fourth cone is sensitive to light in the ultraviolet range, contrary to humans, a bird is able to see in the ultraviolet range of the light spectrum. Proprietary research of ONCE/Signify has even further determined that ultraviolet light does not disrupt the circadian activity (i.e. daily rhythms) or melatonin production of birds, i.e. chickens in particular. The present invention leverages this insight.

Namely: The illumination system according to the invention illuminates a space for rearing a flock of birds. Throughout the application, the space may be an indoor space, for example the indoor space of an agricultural facility. The illumination system comprises a visible light source, an ultraviolet light source, and a controller. The controller controls the visible light source to emit the visible light for a predetermined period of light, and not to emit the visible light for a predetermined period of dark, thereby entraining a circadian rhythm of the flock of birds. This is advantageous for rearing the flock of birds, and the productivity thereof.

However, birds are generally known to be hungry when awake, for example broiler chicken. Moreover, a certain part of the flock of birds, especially in the case of poultry, may remain awake anyhow. Therefore, for the predetermined period of dark, when the visible light source is not emitting any visible light, birds that already awaken may clearly experience hunger, but may not be able to feed due to the dark. This is a clear disadvantage during the predetermined period of dark, but—as mentioned above—also renders gastrointestinal and behavioral problems when the predetermined period of light starts.

Hence, the controller according to the invention controls the ultraviolet light source to emit ultraviolet light at an ultraviolet light intensity for at least one subperiod within the predetermined period of dark. The ultraviolet light may thereby comprise a peak wavelength within the UV-A wavelength range.

This is clearly advantageous, because the emitted ultraviolet light enables (awaken) birds to still see the space (or the environment) during the predetermined period of dark, and thereby enable to more efficiently feed and drink during the dark, without the entrained circadian rhythm (i.e. day/night cycle) and their melatonin cycle are being disturbed. Hence, the controller according to the invention may be configured to set a circadian cycle to entrain a circadian rhythm of the flock of birds, wherein the circadian cycle comprises the controller controlling the visible light source to emit the visible light for a predetermined period of light, and not to emit the visible light for a predetermined period of dark.

Consequently, the birds still maintain their normal circadian rhythm, and thereby grow as scheduled, but with less stress of starvation during the predetermined period of dark. Moreover, the food intake of the flock of birds may be more evenly spread throughout the entire 24-hour cycle. Even further, when the predetermined period of light commences after the predetermined period of dark, the flock of birds may be less voraciously feeding, rendering less crowding, bruises and injuries.

All in all, the illumination system according to the present invention improves the health and wellbeing of the flock of birds, while maintaining the normal circadian rhythm.

Said flock of birds may preferably be a flock of chicken. Said flock of birds may alternatively be a flock of one or more of: Turkeys, Ducks, Geese, Pheasant, Quail, Guinea Fowl, Heritage Breed Chickens, Pet Birds, Songbirds.

Said visible light source may be phrased as a visible lighting system, throughout. Said ultraviolet light source may be phrased as an ultraviolet lighting system, throughout. The visible light source and the ultraviolet light source may be embodied within a same housing of a same lighting apparatus, for example a luminaire.

The emitted ultraviolet light may, in alternative aspects, comprise a peak wavelength within the UV-B wavelength range. Hence, in aspects, the emitted ultraviolet light may comprise a peak wavelength within the UV-B and/or within the UV-A wavelength range. Hence, in aspects, the emitted ultraviolet light may comprise a first peak wavelength within the UV-A wavelength range, and a second peak wavelength within the UV-B wavelength range.

Said predetermined period of light may be phrased as period of light. Said predetermined period of light may be phrased as predetermined period of day. Said predetermined period of dark may be phrased as period of dark. Said predetermined period of dark may be phrased as predetermined period of night.

The predetermined period of light may comprise a time duration of light. The predetermined period of dark may comprise a time duration of dark. The time duration of light and/or the time duration of dark may be set to values corresponding to the desired rearing the flock of birds. Said duration of light may for example be 20 hours. Said duration of dark may then for example be 4 hours. The predetermined period of light and the predetermined period of dark may be recurring (on a 24 hour circadian cycle).

In aspects, said visible light may comprise a visible light characteristic. Said visible light characteristic may e.g. be a light intensity. Thereby, in aspects, throughout the application, said phrasing of 'not emitting said visible light' may include not emitting said visible light comprising said visible light characteristic. Hence, during the predetermined period of dark, visible light may still be emitted, albeit not comprising said visible light characteristic. For example, said visible light (e.g. white light) may comprise a maximum visible light intensity in the predetermined period of light, while in the predetermined period of dark the visible light is either off altogether, or is dimmed to only 1% of said maximum visible light intensity. Such artificial lighting, light periods, dark periods, may be well established in animal farming and clear.

In an embodiment, the at least one subperiod is one subperiod, wherein said one subperiod lasts the whole predetermined period of dark. Such an embodiment is advantageous, as the flock of are still able to see the space (or the environment) during the whole predetermined period of dark, and are thereby enabled to more efficiently feed and drink during the whole period of dark, without the entrained circadian rhythm (i.e. day/night cycle) and their melatonin cycle are being disturbed.

In a different embodiment, a subperiod of the at least one subperiod ends at a same time as the predetermined period of dark and lasts for a duration equal to at most a quarter of the predetermined period of dark. Such an embodiment is advantageous, because the ultraviolet light is emitted in a subperiod that precedes, and abuts with, the beginning of the predetermined period of light. Consequently, since at least part of the flock of birds will have had the opportunity to feed during the predetermined period of dark due to the emitted ultraviolet light, that is visible to the avians, the above mentioned problems are mitigated at the beginning of the predetermined period of light, when the visible light is emitted again. This improves the health and wellbeing of the birds.

In aspects, the at least one subperiod may last for a duration equal to at most a third of the predetermined period of dark, or at most a fifth of the predetermined period of dark, at most a tenth of the predetermined period of dark.

In an embodiment, the system comprises a first feed dispensing means arranged at a first region of the space; wherein the controller is configured to control the ultraviolet light source to emit the ultraviolet light at the ultraviolet light intensity for a subperiod within the predetermined period of dark to illuminate the first region of the space.

In yet a different embodiment, the illumination system may comprise a sensor unit configured to detect, during the predetermined period of dark, a property indicative of at least one bird of the flock of birds being awake; wherein the controller is configured to control the ultraviolet light source to emit the ultraviolet light at the ultraviolet light intensity for a subperiod within the predetermined period of dark when said property is detected.

In yet a different embodiment, the illumination system may comprise a sensor unit configured to detect, during the predetermined period of dark, a property indicative of at least one bird of the flock of birds being awake; wherein the controller may be configured to: determine a number of birds being awake based on said property, and control the ultraviolet light source to emit the ultraviolet light at the ultraviolet light intensity for a subperiod within the predetermined period of dark when said number of birds being awake exceeds a predefined threshold number. Such an embodiment is advantageous, because the ultraviolet light is only provided when a threshold number of birds are being awake, thereby preventing the ultraviolet light to be unnecessarily consuming energy for only a limited number of birds. Said number may at least be one, i.e. e.g. one detected bird being awake. The present invention may therefore be advantageously applied to a certain critical mass of birds, while also providing advantages on energy consumption level. In an embodiment, said predefined threshold number is at least ten. Alternatively, said predefined threshold number is at least a hundred, or at least two hundred.

Hence, when said number of birds being awake exceeds a predefined threshold number, the ultraviolet light source is controlled to emit the ultraviolet light at the ultraviolet light intensity for a subperiod within the predetermined period of dark. This subperiod may be considered the hold time for which the ultraviolet light is kept on after detecting said threshold number of birds being awake. In an embodiment, said subperiod lasts for a duration equal to at most a half of the predetermined period of dark.

For example, if the predetermined period of dark is 2 hours, the subperiod may last for at most 1 hour. Other values may be envisioned similarly. Alternatively, in aspects, said subperiod may last for a duration equal to at most a quarter of the predetermined period of dark, or at most a tenth of the predetermined period of dark, or between a tenth and a fifth of the predetermined period of dark. Said subperiod may comprise a duration tailored for example to the desired feed intake of a bird of the flock of birds during the predetermined period of dark.

In an embodiment, the sensor unit comprises at least one of: a camera, a thermal camera, a microphone, a motion sensor, a sensor arrangement for radiofrequency-based sensing, a PIR sensor, a thermopile array, a Single Pixel Thermopile, a range sensor, a VOC sensor, a pressure sensor.

For example, the camera may detect an image of at least one sleeping bird directly. For example, the motion detector may detect motion of at least one bird, which motion may be indicative of the at least one bird being awake. For example, the microphone detector may detect sound level or noise of at least one bird, which sound level or noise may be indicative of the at least one bird being awake. Alternatively, other properties of sound may be detected, such as audio footprints of awake birds. For example, the VOC detector may detect dust levels caused by the at least one bird, which dust level may be indicative of the at least one bird being awake. For example, the thermopile array may detect a heat signature of at least one bird being active, which heat signature may be indicative of the at least one bird being awake.

Yet in a further related embodiment, the system comprises a first feed dispensing means arranged at a first region of the space; wherein the controller is configured to control the ultraviolet light source to emit the ultraviolet light at the ultraviolet light intensity for a subperiod within the predetermined period of dark to illuminate the first region of the space when said number of birds being awake exceeds the predefined threshold number. Hence, when said number of birds being awake exceeds a predefined threshold number, the first region in which first feed dispensing means may be illuminated with the ultraviolet light, such that particularly the feed dispensing means becomes visible for said number of birds of the flock of birds for the subperiod within the predetermined period of dark.

In an embodiment, the ultraviolet light intensity may be at most 50% of a maximum intensity of the ultraviolet light source. Said intensity of at most 50% of the maximum intensity of the ultraviolet light source may be sufficient illumination to enable a bird of the flock of birds to find food and water, while not sufficient illumination to possibly wake up other, sleeping, birds of the flock of birds. In aspects, said ultraviolet light intensity may for example be between 1 and 20 lux, preferable between 1 and 10 lux.

In an embodiment, the controller may be configured to control the ultraviolet light source to emit the ultraviolet light at a first ultraviolet light intensity during a first subperiod within the predetermined period of dark to illuminate a first region of the space; wherein the controller is configured to control the ultraviolet light source to emit the ultraviolet light at a second ultraviolet light intensity during a second subperiod within the predetermined period of dark to illuminate a second region of the space; wherein the first subperiod and the second subperiod are non-overlapping in time; wherein the first region of the space is different from the second region of the space. Such an embodiment is advantageous, as it allows to provide the ultraviolet light at different subperiods to different regions of the space. This may also enable that parts of the space may consecutively be provided with the ultraviolet light according to the present invention, so as to control the feeding and drinking behavior of the flock of birds more precisely for the predetermined period of dark.

In an embodiment, the system comprises a first feed dispensing means and a second feed dispensing means; wherein first feed dispensing means is arranged in the first region, wherein the second feed dispending means is arranged in the second region; wherein the first ultraviolet light intensity and the second ultraviolet light intensity are at most 50% of a maximum intensity of the ultraviolet light source. Such an embodiment is advantageous, as different feed dispensing means may be illuminated during different subperiods within the predetermined period of dark, so as to visualize said different feed dispensing means for the birds of the flock of birds during the predetermined period of dark.

In an embodiment, wherein the first region of the space comprises a first part of the flock of birds, wherein the second region of the space comprises a second part of the flock of birds; wherein the first ultraviolet light intensity and the second ultraviolet light intensity are at a maximum intensity of the ultraviolet light source. Such an embodiment is advantageous, because it provides the ultraviolet light, being at a maximum intensity of the ultraviolet light source, at different regions within the space at different subperiods within the predetermined period of dark. This enables to awaken one part of the flock of birds with the maximum intensity of ultraviolet light during a particular subperiod within the predetermined period of dark. Said part of the flock can then feed and drink during said particular subperiod within the predetermined period of dark.

In an embodiment, the ultraviolet light source comprises at least one ultraviolet light source unit to illuminate respectively at least one region of said space. For example: The ultraviolet light source may e.g. be an array of luminaires and the at least one ultraviolet light source unit may be a luminaire of the array of luminaires. Each luminaire may thereby illuminate a respective region of the space.

It is a further object of the invention to provide a method, which at least alleviates the problems and disadvantages mentioned above. Thereto, the invention provides a method of illuminating a space for rearing a flock of birds, wherein the method comprises: entraining a circadian rhythm of the flock of birds by controlling a visible light source to emit the visible light for a predetermined period of light, and not to emit the visible light for a predetermined period of dark; controlling an ultraviolet light source to emit ultraviolet light at an ultraviolet light intensity for at least one subperiod within the predetermined period of dark, wherein the ultraviolet light comprises a peak wavelength within the UV-A wavelength range. The advantages and/or embodiments applying to the lighting device according to the invention may also apply mutatis mutandis to the method according to the invention.

In an embodiment, the method comprises: detecting, during the predetermined period of dark, a property indicative of at least one bird of the flock of birds being awake; determining a number of birds being awake based on said property; controlling the ultraviolet light source to emit the ultraviolet light at the ultraviolet light intensity for a subperiod within the predetermined period of dark when said number of birds being awake exceeds a predefined threshold number.

BRIEF DESCRIPTION OF THE DRAWINGS

The invention will now be further elucidated by means of the schematic non-limiting drawings.

DETAILED DESCRIPTION OF THE EMBODIMENTS

Figure 1:
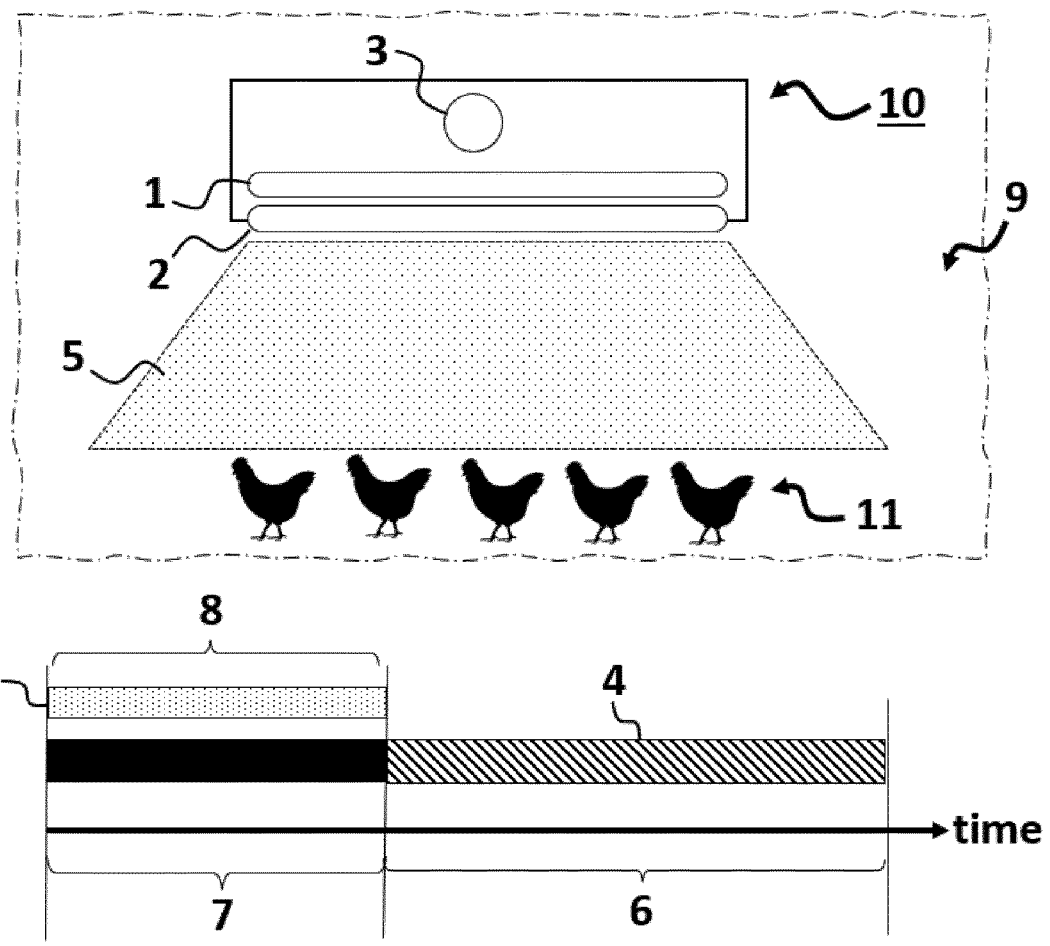
FIG. 1 depicts schematically an embodiment of an illumination system according to the invention.

FIG. 1 depicts schematically, by non-limiting example, an illumination system 10 according to the invention. The illumination system 10 is arranged in a space 9. The space 9 is an agricultural space 9 for rearing a flock of birds 11. Here, the flock of birds 11 is a flock of broiler chicken, but may alternatively be any other bird suitable for rearing in an agricultural facility. The illumination system illuminates, in operation, the space 9 and thereby said flock of broiler chicken 11.

The illumination system 10 comprises a visible light source 1, an ultraviolet light source 2, and a controller 3. The controller 3 controls, in operation, the visible light source 1 and the ultraviolet light source 2. Here, the ultraviolet light source 2 and the visible light source 1 are depicted to be part of a same luminaire, or same luminaire housing, within which also the controller is accommodated. Alternatively, said visible light source and said ultraviolet light source may be separate lighting devices, which may be controlled by a remotely arranged controller.

The visible light source 1 is configured to emit visible light 6. More specifically, the controller 3 controls the visible light source 1 to entrain a circadian rhythm of the flock of birds 11. This is done by the controller 3 controlling the visible light source 1 to emit the visible light 4 for a predetermined period of light 6, and not to emit the visible light 6 for a predetermined period of dark 7.

Here, merely as an example, the predetermined period of dark comprises a duration of 4 hours, while the predetermined period of light comprises a duration of 20 hours, (in total). Other alternative schedules of light and dark may be envisioned similarly.

Hence, as known in practice and the art, the visible light source 1 is able to render artificial lighting in the agriculture space 9 for entraining a circadian rhythm of said flock of birds 11, wherein said circadian rhythm is generally characterized by a 24-hour cycle comprising alternating periods of light (or: day) and periods of dark (or: night).

However, during such a period of dark, the flock of birds may not eat and drink, due to for example sleep or their inability to find food in the dark. This results in that their gastrointestinal tracts are nearly empty when the period of light (or: day) commences. Even after commencing the period of light within the circadian cycle, because the flock of birds may be very hungry, the flock of birds may exhibit a voraciously eating behavior and may cause harmful crowding at feeding throughs and water nipples.

Therefore, still referring to FIG. 1, the illumination system 10 according to the invention comprises an ultraviolet light source 2. The ultraviolet light source 2 is configured to emit ultraviolet light 5. Here, the ultraviolet light 5 comprises a peak wavelength within the UV-A wavelength range, but may alternatively or additionally comprise a peak wavelength within the UV-B wavelength range as well.

More specifically, the controller 3 controls the ultraviolet light source 2 to emit the ultraviolet light 5 at an ultraviolet light intensity for at least one subperiod 8 within the predetermined period of dark 7. Here, the at least one subperiod 8 is one subperiod 8. This one subperiod 8 lasts substantially the whole predetermined period of dark 7. Namely, in the present example, said one subperiod 8 also comprises a duration of 4 hours. Consequently, during the predetermined period of dark 7 the flock of birds 11 are also provided with said ultraviolet light 5 comprising a peak wavelength within the UV-A wavelength range.

Figure 2:
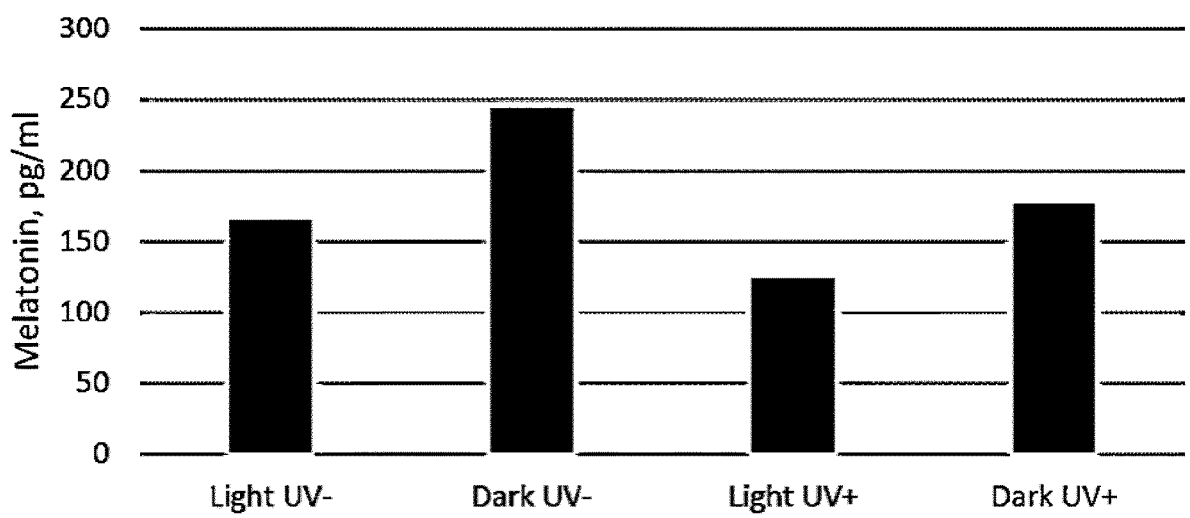
FIG. 2 depicts schematically experimental results that ultraviolet light does not disrupt the melatonin cycle of birds.

Therefore, the illumination system 10 effectuates an increased health and wellbeing of the flock of birds 11. Namely: Proprietary research of ONCE/Signify has determined that ultraviolet light does not disrupt the circadian activity (i.e. daily rhythms) or melatonin production of birds, i.e. chickens in particular. FIG. 2 depicts results of this research, in which it is clear that even with UV-A light, the melatonin production of birds remain unaffected (i.e. increases during the periods of dark, and decreases in the periods of light).

Hence, since the ultraviolet light source 2 is controlled to emit the ultraviolet light 5, birds of the flock of birds 11—when awaken and hungry—are still able to see within the space 9 and are thereby able to more efficiently feed and drink during the predetermined period of dark 7, without the entrained circadian rhythm (i.e. day/night cycle) and their melatonin cycle are being disturbed.

Consequently, the birds still maintain their normal circadian rhythm, and thereby grow as scheduled, but with less stress of starvation during the predetermined period of dark 7, and with less harmful behavior when the predetermined period of light 6 commences after the predetermined period of dark 7.

Moreover, still referring to FIG. 1, the ultraviolet light intensity is at most 50% of a maximum intensity of the ultraviolet light source 2. In the present embodiment, as an example, the ultraviolet light intensity is 5 lux. Said ultraviolet light intensity is selected such, in the present embodiment, that it does not actively wake up birds of the flock of birds 11, but still provides sufficient intensity for awaken birds of the flock of birds 11 to find food and water in the space 9. Said value may alternatively be any other suitable lux value.

Figure 3:
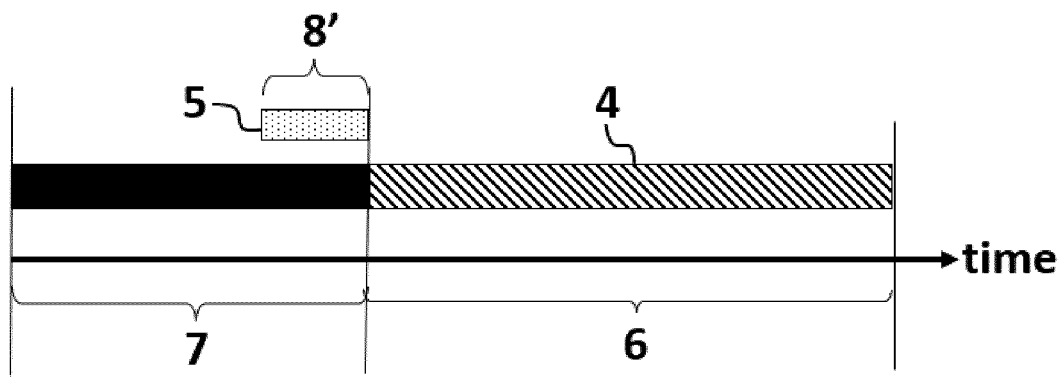
FIG. 3 depicts schematically an embodiment of an operation of the illumination system depicted in FIG. 1.

FIG. 3 depicts schematically, by non-limiting example, the same illumination system 10 as depicted in FIG. 1, but with a different operation according to the invention. Namely: The controller 3 is similarly configured to control the ultraviolet light source 2 to emit the ultraviolet light 5 at an ultraviolet light intensity for at least one subperiod 8' within the predetermined period of dark 7.

However, in the present embodiment, a subperiod 8' of the at least one subperiod ends at a same time as the predetermined period of dark 7 and lasts for a duration equal to at most a quarter of the predetermined period of dark 7. Because said subperiod 8' precedes and abuts the predetermined period of light 6 in time, the ultraviolet light 5 is illuminating the space 9 just before the predetermined period of light 6 commences and the flock of birds 11 awaken (based on their circadian rhythm).

This is advantageous, because the predetermined period of light 6, in which feed and water are visible to the flock of birds 11, is extended in time to the predetermined period of dark 7. Birds of the flock of birds 11, which are awake before the predetermined period of light 6 commences, will have the opportunity to already start feeding and drinking, without the entrained circadian rhythm (i.e. day/night cycle) and their melatonin cycle are being disturbed. This reduces the amount of hungry and voraciously eating birds at the time the predetermined period of light 6 commences, thereby reducing crowding and injuries.

Figure 4:
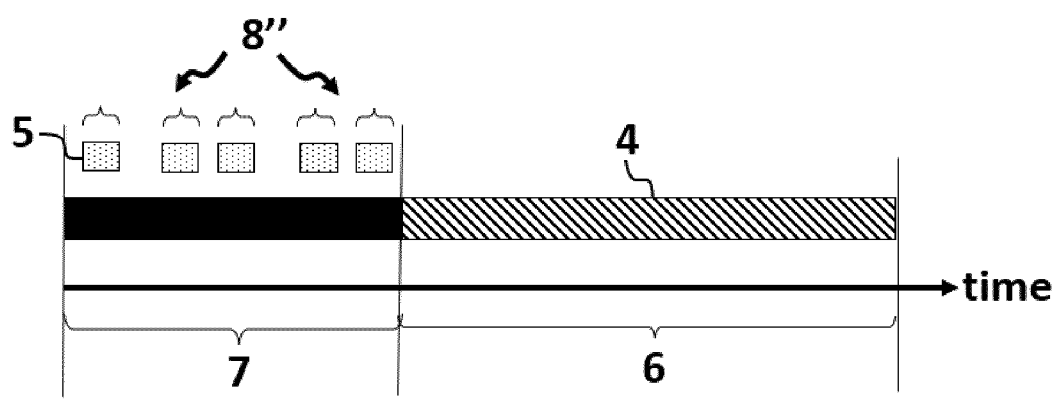
FIG. 4 depicts schematically an embodiment of an operation of the illumination system depicted in FIG. 1.

FIG. 4 depicts schematically, by non-limiting example, the same illumination system 10 as depicted in FIG. 1, but with a different operation according to the invention. Namely: The controller 3 is similarly configured to control the ultraviolet light source 2 to emit the ultraviolet light 5 at an ultraviolet light intensity for at least one subperiod 8" within the predetermined period of dark 7.

However, in the present embodiment, said at least one subperiod 8" is a plurality of intermittent subperiods 8" within the predetermined period of dark 7. Each of said plurality of intermittent subperiods 8" may for example be predefined according to a schedule, or may for example be triggered by a sensor. Said sensor may e.g. detect awaken birds. Said intermittent subperiods 8" may also be scheduled such to induce a physiological response of the flock of chicken.

Figure 5:
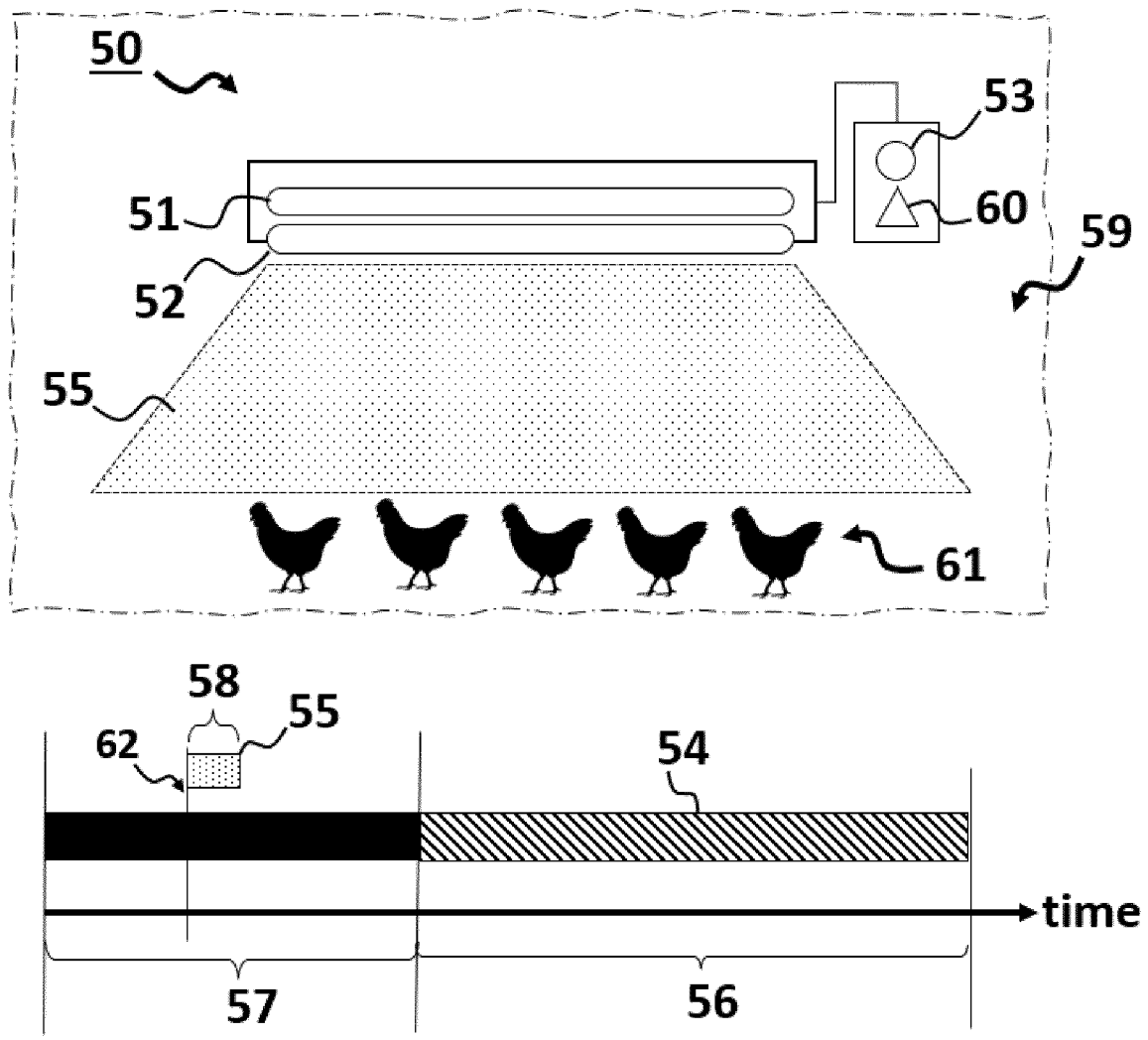
FIG. 5 depicts schematically an embodiment of an illumination system according to the invention.

FIG. 5 depicts schematically, by non-limiting example, an illumination system 50 according to the invention. The illumination system 50 is arranged in a space 59. The space 59 is an agricultural space 59 for rearing a flock of birds 61. Here, the flock of birds 61 is a flock of turkey, but may alternatively be any other bird suitable for rearing in an agricultural facility, such as chicken. The illumination system illuminates, in operation, the space 59 and thereby said flock of birds 61.

The illumination system 50 comprises a visible light source 51, an ultraviolet light source 52, a controller 53, and a sensor unit 60. The controller 53 controls, in operation, the visible light source 51 and the ultraviolet light source 52. Here, the ultraviolet light source 52 and the visible light source 51 are depicted to be part of a same lighting device, such as a luminaire. Alternatively, said visible light source and said ultraviolet light source may be separate lighting devices.

The controller 53 is arranged remotely from said ultraviolet light source 52 and said visible light source 51, but in communication therewith via wired communication. For example via Power Line Communication (PLC). This may alternatively be via wireless communication, such as BLE, ZigBee, RF, Wi-Fi, VLC, Lo-Ra, etc.

The visible light source 51 is configured to emit visible light 56. More specifically, the controller 53 controls the visible light source 51 to entrain a circadian rhythm of the flock of birds 61. This is done by the controller 53 controlling the visible light source 51 to emit the visible light 54 for a predetermined period of light 56, and not to emit the visible light 56 for a predetermined period of dark 57.

Here, merely as an example, the predetermined period of dark comprises a duration of 6 hours, while the predetermined period of light comprises a duration of 18 hours. Other alternative schedules of light and dark may be envisioned similarly.

Hence, as known in practice and the art, the visible light source 51 is able to render artificial lighting in the agriculture space 59 for entraining a circadian rhythm of said flock of birds 61, wherein said circadian rhythm is generally characterized by a 24-hour cycle comprising alternating periods of light (or: day) and periods of dark (or: night).

However, during such a period of dark, the flock of birds may not eat and drink, due to for example sleep or their inability to find food in the dark. This results in that their gastrointestinal tracts are nearly empty when the period of light (or: day) commences. Even after commencing the period of light within the circadian cycle, because the flock of birds may be very hungry, the flock of birds may exhibit a voraciously eating behavior and may cause harmful crowding at feeding throughs and water nipples.

Therefore, still referring to FIG. 5, the illumination system 50 according to the invention comprises the ultraviolet light source 52. The ultraviolet light source 52 is configured to emit ultraviolet light 55. Here, the ultraviolet light 55 comprises a peak wavelength within the UV-A wavelength range, but may alternatively or additionally comprise a peak wavelength within the UV-B wavelength range as well.

Moreover, the illumination system 50 according to the invention comprises the sensor unit 60. The sensor unit 60 detects, in operation, during the predetermined period of dark 57, a property indicative of at least one bird of the flock of birds 61 being awake. Here, said sensor unit 60 is a motion detector for detecting the property of motion. Said property of motion is indicative of at least one bird of the flock of birds being awake. Here, the sensor unit 60 and the controller 53 are housed within a same device and in communication with each other, but the sensor unit and the controller may alternatively be separate devices.

Alternatively, said sensor unit 60 may comprise at least one of: a camera, a thermal camera, a microphone, a sensor arrangement for radiofrequency-based sensing, a PIR sensor, a thermopile array, a Single Pixel Thermopile, a range sensor, a VOC sensor, a pressure sensor. Yet alternatively, said sensor unit may be a body worn sensor, such as a tag or radiofrequency tag. Said tag may e.g. be mounted onto at least one bird of the flock of birds.

More specifically, the controller 53 determines a number of birds being awake based on said property, namely said motion. Here, as an example, the sensor unit 60 detects said motion at a particular moment in time 62 during the predetermined period of dark 57. The motion is thereby indicative of twenty birds of the flock of birds 61 being awake. Hence, the controller 53 determines that twenty birds of the flock of birds 61 are awake.

Furthermore, the controller 53 determines a condition in which said number of birds being awake exceeds a predefined threshold number. Here, as an example, said predefined threshold number is ten. Therefore, said condition is determined, because the detected twenty birds exceeds the predefined threshold number of ten. Alternatively, said predefined threshold number may be envisioned to be a different value, e.g. depending on the operations of the livestock facility or the type of the flock of birds.

Even further, the controller 53 controls the ultraviolet light source 52 to emit the ultraviolet light 55 at an ultraviolet light intensity for at least one subperiod 58 within the predetermined period of dark 57 when said number of birds being awake exceeds the predefined threshold number, (or when said condition is determined). Since this is the case, the ultraviolet light source 52 is controlled to emit said ultraviolet light 55.

Here, the at least one subperiod 58 is a subperiod 58. Thus, this subperiod 58 starts essentially at said particular moment in time 62, and lasts for a duration equal to one-sixth of the predetermined period of dark 57. Namely, in the present example, said subperiod 58 comprises a duration of one hour, as the predetermined period of time lasts for six hours. Alternatively, said duration may be equal to at most half of the predetermined period of dark, or at most a quarter of the predetermined period of dark, such as a tenth of the predetermined period of dark. Alternatively, in embodiments, said sensor unit may only be active during said predetermined period of dark.

In alternative examples, said sensor unit may detect said condition a plurality of times within the predetermined period of dark. Hence, each time said condition (of the number of birds being awake exceeding a predefined threshold number) is determined, the ultraviolet light source may be controlled to emit the ultraviolet light for a respective subperiod.

Consequently, during the predetermined period of dark 57 the flock of birds 61 are provided with said ultraviolet light 55 comprising a peak wavelength within the UV-A wavelength range, for a subperiod equal to one-sixth of the predetermined period of dark 57 after the sensor unit 60 has detected said property and the controller 53 has determined that the number of birds being awake exceeds the predefined threshold number.

Therefore, the illumination system 50 effectuates an increased health and wellbeing of the flock of birds 61, as partly mentioned above throughout the application. Namely, since the ultraviolet light source 52 is controlled to emit the ultraviolet light 55, a threshold number of awaken birds of the flock of birds 61 are still enabled to see within the space 59 and are thereby able to more efficiently feed and drink during the subperiod 58 within the predetermined period of dark 57, without the entrained circadian rhythm (i.e. day/night cycle) and their melatonin cycle are being disturbed.

Consequently, the birds still maintain their normal circadian rhythm, and thereby grow as scheduled, but with less stress of starvation during the predetermined period of dark 57, and with less harmful behavior when the predetermined period of light 56 commences after the predetermined period of dark 57. Even further, since the ultraviolet light source 52 is controlled based on the detection of the sensor unit, the ultraviolet light source 52 may be more effectively and efficiently (i.e. e.g. in terms of power) be controlled.

Moreover, still referring to FIG. 5, the ultraviolet light intensity is at most 50% of a maximum intensity of the ultraviolet light source 52. In the present embodiment, as an example, the ultraviolet light intensity is 2 lux. Said ultraviolet light intensity is selected such, in the present embodiment, that it does not actively wake up birds of the flock of birds 61, but still provides sufficient intensity for the detected awaken birds of the flock of birds 61 to find food and water in the space 9. Said value may alternatively be any other suitable lux value.

In an embodiment, not depicted, the illumination system of FIG. 1 and/or FIG. 5 comprises a first feed dispensing means arranged at a first region of the space. The controller is then configured to control the ultraviolet light source to emit the ultraviolet light at the ultraviolet light intensity for said subperiod within the predetermined period of dark to illuminate this first region of the space. In the case of said illumination system of FIG. 5, this illumination is when said number of birds being awake exceeds the predefined threshold number.

Figure 6:
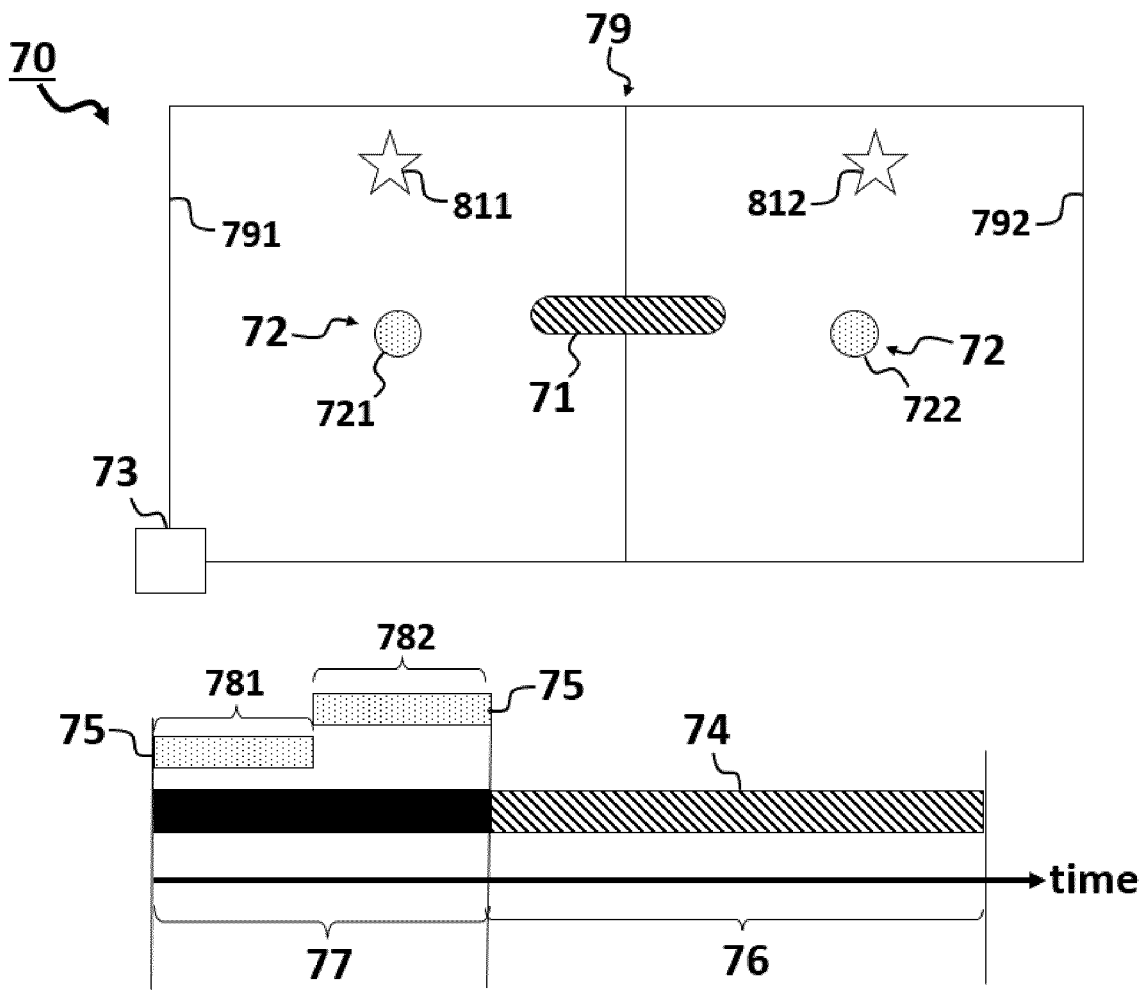
FIG. 6 depicts schematically an embodiment of an illumination system according to the invention.

FIG. 6 depicts schematically, by non-limiting example, an embodiment of an illumination system 70 according to the invention. The illumination system 70 is arranged in a space 79. The space 80 is an agricultural facility for rearing a flock of birds (not depicted). Here, the flock of birds is a flock of chicken. The illumination system 70 illuminates, in operation, the space 79 and thereby said flock of birds.

The space 79 comprises a first region 791 and a second region 792. The first region 791 and the second region 792 are different. The first region 791 comprises, optionally, a first feed dispensing means 811. The second region 792 comprises, optionally, a second feed dispensing means 812. Hence, the illumination system 70 may in such embodiments also optionally comprise said first feed dispensing means 811 and said second feed dispensing means 812. Alternatively, said first region and said second region may at least partially overlap. Said space may alternatively, and optionally comprise at least one further region, such as a third region and a fourth region.

Still referring to FIG. 6, the illumination system 70 comprises a visible light source 71, an ultraviolet light source 72, and a controller 73. The controller 73 controls, in operation, the visible light source 71 and the ultraviolet light source 72. The controller 73 is thereby arranged remotely from said ultraviolet light source 72 and said visible light source 71, but in wireless communication therewith via a wireless communication modality, such as BLE, ZigBee, RF, Wi-Fi, VLC, Lo-Ra, etc. Alternatively, said controller and visible light source and ultraviolet light source(s) may be via a wired connection.

The visible light source 71 is configured to emit visible light 74 into the space 79. That is: both the first region 791 of the space 79 and the second region 792 of the space 79. More specifically, the controller 73 controls the visible light source 71 to entrain a circadian rhythm of the flock of birds. This is done by the controller 73 controlling the visible light source 71 to emit the visible light 74 for a predetermined period of light 76, and not to emit the visible light 74 for a predetermined period of dark 77.

Here, merely as an example, the predetermined period of dark 77 comprises a duration of 8 hours, while the predetermined period of light 76 comprises a duration of 16 hours, (in total). Other alternative schedules of light and dark may be envisioned similarly.

Hence, as known in practice and the art, the visible light source 71 is able to render artificial lighting in the space 79 for entraining a circadian rhythm of said flock of birds, wherein said circadian rhythm is generally characterized by a 24-hour cycle comprising alternating periods of light (or: day) and periods of dark (or: night).

Still referring to FIG. 6, the illumination system 70 according to the invention comprises the ultraviolet light source 72. The ultraviolet light source 72 is configured, in operation, to emit ultraviolet light 75 into said space 79. Here, the ultraviolet light 75 comprises a peak wavelength within the UV-A wavelength range, but may alternatively or additionally comprise a peak wavelength within the UV-B wavelength range as well.

Moreover, in the present embodiment, the ultraviolet light source 72 is an array of light source units. Such a light source unit may e.g. be a luminaire. Namely, the ultraviolet light source 72 comprises a first ultraviolet light source unit 721, and a second ultraviolet light source unit 722, both configured to emit said ultraviolet light 75. The first ultraviolet light source unit 721 is arranged to illuminate the first region 791 of the space 79; and the second ultraviolet light source unit 722 is arranged to illuminate the second region 792 of the space 79.

In alternatively examples, the ultraviolet light source may be a single luminaire that is configured to separately illuminate at least one of a plurality of regions within said space. Such a luminaire may therefore comprise at least one ultraviolet light source unit, at least one optic, and/or at least one beam steering means.

More specifically, still referring to the embodiment depicted in FIG. 6, the controller 73 controls the first ultraviolet light source unit 721 to emit the ultraviolet light 75 at a first ultraviolet light intensity during a first subperiod 781 within the predetermined period of dark 77 to illuminate the first region 791 of the space 79. The controller 73 similarly controls the second ultraviolet light source unit 722 to emit the ultraviolet light 75 at a second ultraviolet light intensity during a second subperiod 782 within the predetermined period of dark 77 to illuminate a second region 792 of the space 79. Still referring to FIG. 7, the first subperiod 781 and the second subperiod 782 are non-overlapping in time. Here, the first subperiod precedes 781 the second subperiod 782. Here, the first subperiod 781 abuts the second subperiod 782. Alternatively, said first subperiod and said second subperiod may be independent from each other, and their properties (such as duration and begin and end points in time) envisioned such as the examples provided for subperiods in this application.

In the present example, said first subperiod 781 and said second subperiod 782 comprise both a duration equal to half the predetermined period of dark 77. Since the predetermined period of dark comprises a duration of 8 hours in the present example, said duration of the first subperiod 781 and the second subperiod 782 are both 4 hours. Consequently, during the predetermined period of dark 77 the flock of birds are also provided with said ultraviolet light 75 comprising a peak wavelength within the UV-A wavelength range, but first in the first region 791 and subsequently in the second region 792. This advantageously enables a spatial control of the ultraviolet light 75 within the space 79, for example to provide ultraviolet light 75 to the said first feed dispensing means 811 and/or said second feed dispensing means 812.

For example, in alternative aspects, a first sensor unit observing the first region may trigger the first ultraviolet lighting unit to illuminate the first region with the first feed dispensing means; and a second sensor unit observing the second region may trigger the second ultraviolet lighting unit to illuminate the second region with the second feed dispensing means.

Hence, since the ultraviolet light source 72 is controlled to emit the ultraviolet light 75, birds of the flock of birds—when awaken and hungry—are still able to see within the respective regions 791, 792 of said space 79; and are thereby able to more efficiently feed and drink during the predetermined period of dark 7, without the entrained circadian rhythm (i.e. day/night cycle) and their melatonin cycle are being disturbed.

Consequently, the birds still maintain their normal circadian rhythm, and thereby grow as scheduled, but with less stress of starvation during the predetermined period of dark 77, and with less harmful behavior when the predetermined period of light 76 commences after the predetermined period of dark 77.

Moreover, still referring to FIG. 6, the ultraviolet light intensity is at most 25% of a maximum intensity of the ultraviolet light source 72, more specifically the respective ultraviolet light source unit 721, 722. In the present embodiment, as an example, the ultraviolet light intensity is 5 lux. Said ultraviolet light intensity is selected such, in the present embodiment, that it does not actively wake up birds of the flock of birds, but still provides sufficient intensity for awaken birds of the flock of birds to find food and water in the respective regions 791, 792 of said space 79. Said value may alternatively be any other suitable lux value.

In an alternative embodiment, not depicted, but partly similar to the embodiment depicted in FIG. 6, the first region of the space comprises a first part of the flock of birds and the second region of the space comprises a second part of the flock of birds. Thereby, the ultraviolet light intensity is at a maximum intensity of the ultraviolet light source, more specifically the respective ultraviolet light source units. In such an alternative embodiment, as an example, the ultraviolet light intensity may e.g. be 20 lux. Such ultraviolet light intensity may awaken the birds, while not affecting their circadian rhythm and/or melatonin cycle.

Therefore, the illumination system according to the present invention may also actively awake birds within the predetermined period of dark, such that said awaken birds may be able to feed during the predetermined period of dark, so as to mitigate the disadvantages and problems mentioned above. Even further, by regionally targeting the ultraviolet light for awaking the chicken, the feeding of the flock within the predetermined period of dark may be controlled and regulated accordingly. For example, a first part of the flock of birds may be awaken, and provided with visible light to find feed, during a first subperiod; and a second part of the flock of birds may be awaken, and provided with visible light to find feed, during a second subperiod; wherein the first subperiod and second subperiod may be different. This will also regulate crowding during feeding within the predetermined period of dark.

Figure 7:
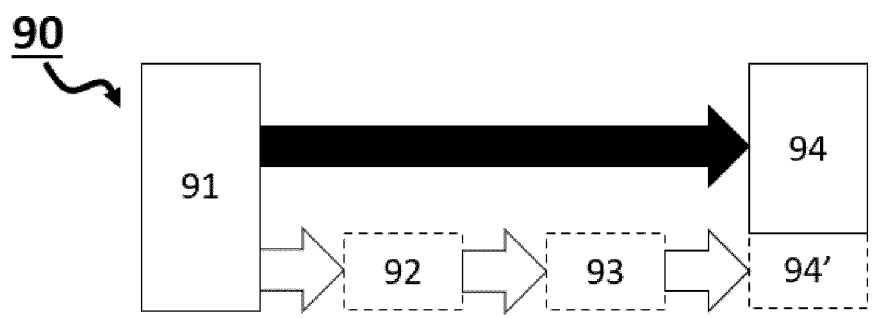
FIG. 7 depicts schematically a method according to the invention.

FIG. 7 depicts schematically, by non-limiting example, a method 90 of illuminating a space for rearing a flock of birds. The method may be performed with the illumination system according to the present invention. The method comprises a step 91 of entraining a circadian rhythm of the flock of birds by controlling a visible light source to emit the visible light for a predetermined period of light, and not to emit the visible light for a predetermined period of dark. Hence, as known in practice and the art, a visible light source is able to render artificial lighting in the space for entraining a circadian rhythm of said flock of birds, wherein said circadian rhythm is generally characterized by a 24-hour cycle comprising alternating periods of light (or: day) and periods of dark (or: night). For example, the predetermined period of dark may comprise a duration of 4 hours, while the predetermined period of light comprises a duration of 20 hours, (in total). The method further comprises a step 94 of controlling an ultraviolet light source to emit ultraviolet light at an ultraviolet light intensity for at least one subperiod within the predetermined period of dark, wherein the ultraviolet light comprises a peak wavelength within the UV-A wavelength range.

In further embodiments, the method may optionally comprise a step 92 of detecting, during the predetermined period of dark, a property indicative of at least one bird of the flock of birds being awake; and a step 93 of determining a number of birds being awake based on said property. Then, the method may comprise a step 94' of controlling the ultraviolet light source to emit the ultraviolet light at the ultraviolet light intensity for a subperiod within the predetermined period of dark when said number of birds being awake exceeds a predefined threshold number.

The invention claimed is:

1. An illumination system arranged to illuminate a space for rearing a flock of birds, the space being an indoor space of an agricultural facility, wherein the illumination system comprises:
   a visible light source configured to emit visible light;
   an ultraviolet light source configured to emit ultraviolet light;
   a controller configured to:
      (i) set a circadian cycle to entrain a circadian rhythm of the flock of birds by controlling the visible light source to emit the visible light for a predetermined period of light, and not to emit the visible light for a predetermined period of dark; and
      (ii) control the ultraviolet light source to emit the ultraviolet light at an ultraviolet light intensity for at least one subperiod within the predetermined period of dark, wherein the ultraviolet light comprises a peak wavelength within the UV-A wavelength range;
   wherein the illumination system comprises a sensor unit configured to detect, during the predetermined period of dark, a property indicative of at least one bird of the flock of birds being awake;
   wherein the controller is configured to control the ultraviolet light source to emit the ultraviolet light at the ultraviolet light intensity for a subperiod within the predetermined period of dark when said property is detected.

2. The illumination system according to claim 1,
   wherein the controller is configured to control the ultraviolet light source to emit the ultraviolet light at a first ultraviolet light intensity during a first duration within the predetermined period of dark to illuminate a first region of the space;
   wherein the controller is configured to control the ultraviolet light source to emit the ultraviolet light at a second ultraviolet light intensity during a second duration within the predetermined period of dark to illuminate a second region of the space;
   wherein the first duration and the second duration are non-overlapping in time;
   wherein the first region of the space is different from the second region of the space.

3. The illumination system according to claim 2, wherein the system comprises a first feed dispensing means and a second feed dispensing means;
   wherein the first feed dispensing means is arranged in the first region, wherein the second feed dispending means is arranged in the second region;
   wherein the first ultraviolet light intensity and the second ultraviolet light intensity are at most 50% of a maximum intensity of the ultraviolet light source.

4. The illumination system according to claim 2, wherein the first region of the space comprises a first part of the flock of birds, wherein the second region of the space comprises a second part of the flock of birds;
   wherein the first ultraviolet light intensity and the second ultraviolet light intensity are at a maximum intensity of the ultraviolet light source.

5. The illumination system according to claim 1,
   wherein the controller is configured to:
   determine a number of birds being awake based on said property, and
   control the ultraviolet light source to emit the ultraviolet light at the ultraviolet light intensity for the subperiod within the predetermined period of dark when said number of birds being awake exceeds a predefined threshold number.

6. The illumination system according to claim 5, wherein said predefined threshold number is at least ten.

7. The illumination system according to claim 1, wherein said subperiod lasts for a duration equal to at most a half of the predetermined period of dark.

8. The illumination system according to claim 1, wherein the sensor unit comprises at least one of: a camera, a thermal camera, a microphone, a motion sensor, a sensor arrangement for radiofrequency-based sensing, a PIR sensor, a thermopile array, a Single Pixel Thermopile, a range sensor, a VOC sensor, a pressure sensor.

9. The illumination system according to claim 1, wherein the system comprises a first feed dispensing means arranged at a first region of the space;
   wherein the controller is configured to control the ultraviolet light source to emit the ultraviolet light at the ultraviolet light intensity for the subperiod within the predetermined period of dark to illuminate the first region of the space when said number of birds being awake exceeds the predefined threshold number.

10. The illumination system according to claim 1, wherein a subperiod of the at least one subperiod ends at a same time as the predetermined period of dark and lasts for a duration equal to at most a quarter of the predetermined period of dark.

11. The illumination system according to claim 1, wherein the ultraviolet light intensity is at most 50% of a maximum intensity of the ultraviolet light source.

12. The illumination system according to claim 1, wherein the ultraviolet light source comprises a first ultraviolet light source unit configured to emit said ultraviolet light and a second ultraviolet light source unit configured to emit said ultraviolet light,
   wherein the first ultraviolet light source unit is arranged to illuminate a first region of the space, and the second ultraviolet light source unit is arranged to illuminate a second region of the space.

13. A method of illuminating a space for rearing a flock of birds, the space being an indoor space of an agricultural facility, wherein the method comprises:
   entraining a circadian rhythm of the flock of birds by controlling a visible light source to emit a visible light for a predetermined period of light, and not to emit the visible light for a predetermined period of dark; and
   controlling an ultraviolet light source to emit ultraviolet light at an ultraviolet light intensity for at least one subperiod within the predetermined period of dark, wherein the ultraviolet light comprises a peak wavelength within the UV-A wavelength range;

detecting, during the predetermined period of dark, a property indicative of at least one bird of the flock of birds being awake;

determining a number of birds being awake based on said property; and controlling the ultraviolet light source to emit the ultraviolet light at the ultraviolet light intensity for a sub-period within the predetermined period of dark when said number of birds being awake exceeds a predefined threshold number.

14. The method of claim 13, further comprising:

controlling the ultraviolet light source to emit the ultraviolet light at a first ultraviolet light intensity during a first duration within the predetermined period of dark to illuminate a first region of the space;

controlling the ultraviolet light source to emit the ultraviolet light at a second ultraviolet light intensity during a second duration within the predetermined period of dark to illuminate a second region of the space;

wherein the first duration and the second duration are non-overlapping in time;

wherein the first region of the space is different from the second region of the space.

15. The method of claim 14, wherein an illumination system arranged to illuminate a space for rearing a flock of birds comprises a first feed dispensing means and a second feed dispensing means;

wherein the first feed dispensing means is arranged in the first region, wherein the second feed dispending means is arranged in the second region;

wherein the first ultraviolet light intensity and the second ultraviolet light intensity are at most 50% of a maximum intensity of the ultraviolet light source.

16. The method of claim 14, wherein the first region of the space comprises a first part of the flock of birds, wherein the second region of the space comprises a second part of the flock of birds;

wherein the first ultraviolet light intensity and the second ultraviolet light intensity are at a maximum intensity of the ultraviolet light source.

17. The method of claim 13, wherein an illumination system arranged to illuminate a space for rearing a flock of birds comprises a first feed dispensing means arranged at a first region of the space, the method further comprising:

controlling the ultraviolet light source to emit the ultraviolet light at the ultraviolet light intensity for a duration within the predetermined period of dark to illuminate the first region of the space when said number of birds being awake exceeds the predefined threshold number.

18. The method of claim of claim 13, wherein the ultraviolet light source comprises a first ultraviolet light source unit configured to emit said ultraviolet light and a second ultraviolet light source unit configured to emit said ultraviolet light, wherein the first ultraviolet light source unit is arranged to illuminate a first region of the space, and the second ultraviolet light source unit is arranged to illuminate a second region of the space.

* * * * *